United States Patent [19]
Prince

[11] 3,855,661
[45] Dec. 24, 1974

[54] AUTOMOTIVE REAR VIEW CLEANING DEVICE

[76] Inventor: Lawrence R. Prince, 13932 Fairluck Avenue, Paramount, Calif. 90723

[22] Filed: Dec. 18, 1972

[21] Appl. No.: 315,924

[52] U.S. Cl............................ 15/250.01, 15/250.26
[51] Int. Cl. ............................................ B60s 1/26
[58] Field of Search....... 15/250.26, 250.01, 250.02, 15/250.03, 250.04; 350/61

[56] References Cited
UNITED STATES PATENTS

| | | | |
|---|---|---|---|
| 1,454,481 | 5/1923 | Mayne | 15/250.26 X |
| 1,484,251 | 2/1924 | Brennan | 15/250.26 X |
| 2,101,773 | 12/1937 | Bowen | 15/250.26 |
| 2,885,708 | 5/1959 | Presser | 15/250.26 X |
| 3,685,087 | 8/1972 | Pittman | 15/250.24 |

*Primary Examiner*—Peter Feldman
*Attorney, Agent, or Firm*—William C. Babcock

[57] ABSTRACT

A power-operated wiper assembly that may be mounted on a conventional external side view mirror or formed as an integral part thereof to reciprocate a spring-loaded wiper blade transversely across the mirror to remove moisture and dirt therefrom, with the operation of the assembly being controllable by the drive of the vehicle from within the cab thereof.

4 Claims, 3 Drawing Figures

3,855,661

AUTOMOTIVE REAR VIEW CLEANING DEVICE

BACKGROUND OF THE INVENTION

1. Field of the Invention

A side view mirror wiper assembly.

2. Description of the Prior Art

The conventional present-day passenger automobile is normally provided with one or more power-operated wipers that reciprocate in an arc as standard equipment to remove moisture, raindrops and other foreign material from the windshield with which they are associated.

On trucks and commercial vehicles side view mirrors are supported by brackets in positions outwardly from the sides of the cab. Such mirrors are elongate in shape, and of insufficient width to permit a conventional wiper that swings in an arc to be mounted thereon. However, such side view mirrors collect moisture and foreign material thereon to the same extent as the windshield, and as a result the safety purpose for which the side view mirrors are provided is destroyed when they are so coated.

The purpose of the present invention is to provide a power-operated wiper assembly that may be either formed as an integral part of a conventional side view mirror or mounted thereon, with the assembly when so mounted on a side view mirror, having a wiper blade that alternatively moves transversely thereacross to remove moisture and foreign material therefrom, and with the operation of the wiper blade being controllable by a driver from within the confines of the cab.

Another reason for devising the present invention is to strive to improve safety in driving, by maintaining side view mirrors on trucks and commercial vehicles in a condition where they may serve their intended purpose, even when subjected to rainfall and conditions that form condensate thereon, such as in fogs, and the like.

SUMMARY OF THE INVENTION

The invention is used in conjunction with a side view mirror of the type that is elongate in shape and is pivotally supported by a pair of brackets on the forward portion of the cab and outwardly therefrom. The mirror has a transverse housing mounted on the lower end thereof, which housing defines a longitudinally extending opening therein. The housing has a longitudinally disposed guide rod situated therein, as well as a second rotatably supported rod that has first and second spiral-shaped grooves formed therein that are angularly positioned relative to one another. The ends of the grooves are in communication with one another. A carriage is mounted in the housing and has two bores formed therein that slidably engage the first and second rods.

A portion of the carriage extends outwardly through said opening in the housing and supports an arm. The arm has a spring-loaded wiper blade mounted on the free end portion thereof. A transverse pin is supported in the carriage and is at all times in engagement with either the first or second grooves. The second rod is rotated by power means such as an electric motor or the like, which motor is controllable by the driver of the vehicle from within the confines of the cab. The motor is connected to the second rod by a flexible cable, or the like. When the motor is energized, the second rod is rotated, and due to the pin being in engagement with either the first or the second grooves, the arm is moved transversely relative to the mirror, with the wiper removing moisture and foreign material therefrom.

Upon the carriage and the pin engaging with the first and second grooves transversing the length of the second rod, the pin moves into engagement with a spiral groove that is so positioned as to reverse the movement of the carriage, arm, and wiper blade, even though the second rod continues to rotate in the same direction. The electric motor preferably has a rheostat type switch operatively associated therewith to permit the driver of the vehicle to control the speed of the motor, which in turn controls the rapidity with which the wiper blade alternates in transverse movement across the mirror to remove foreign material therefrom.

The invention above described may be formed as an integral part of the side view mirror, or is adapted to be added as an accessory to an existing mirror.

DESCRIPTION OF THE PREFERRED EMBODIMENT

Figure 2:
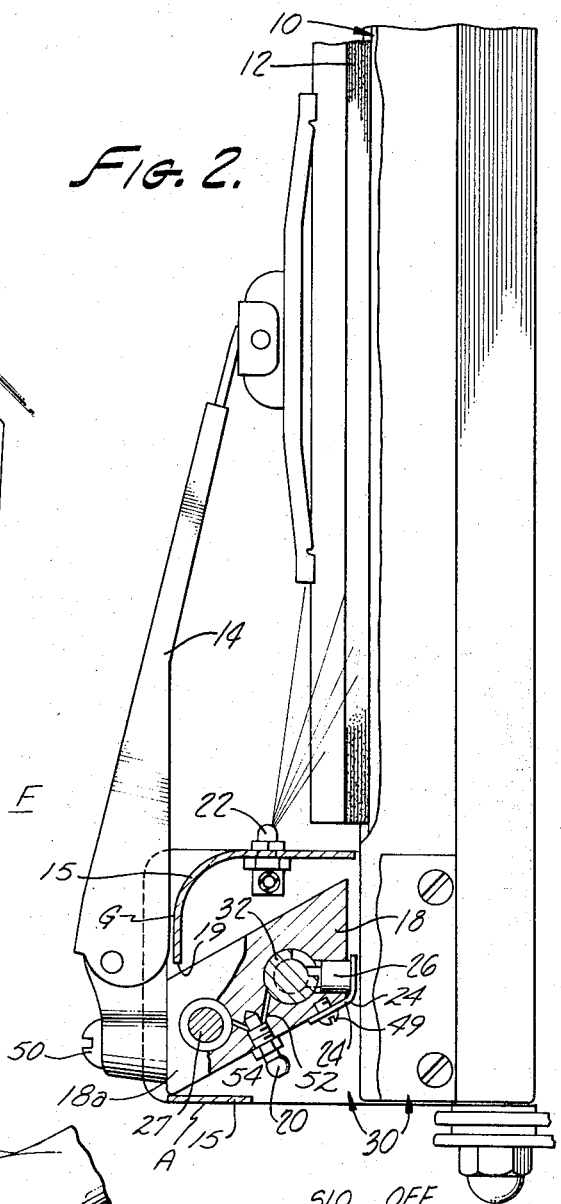
FIG. 2 is a combined side elevational and vertical cross-sectional view of the device shown in FIG. 1, taken on the line thereof.
Figure 1:
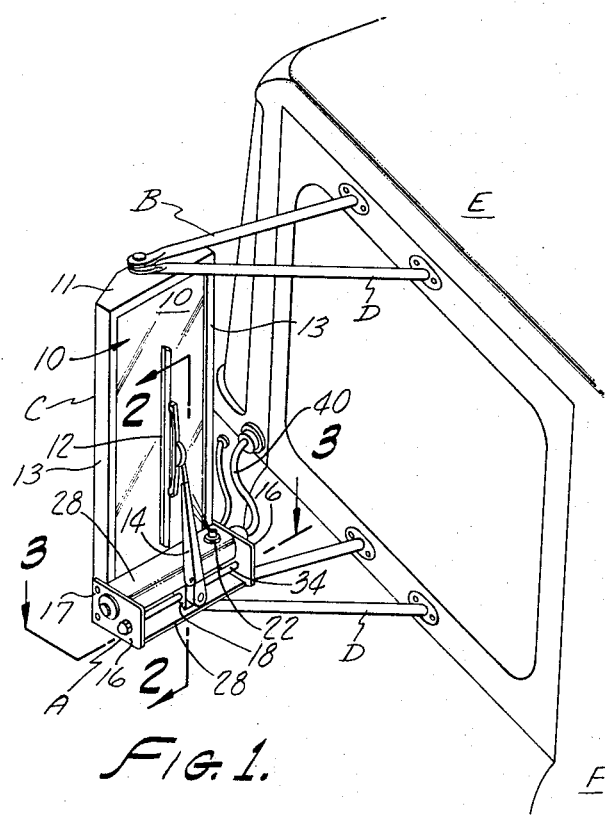
FIG. 1 is a perspective view of a conventional side view mirror with the invention being operatively associated therewith.
Figure 3:
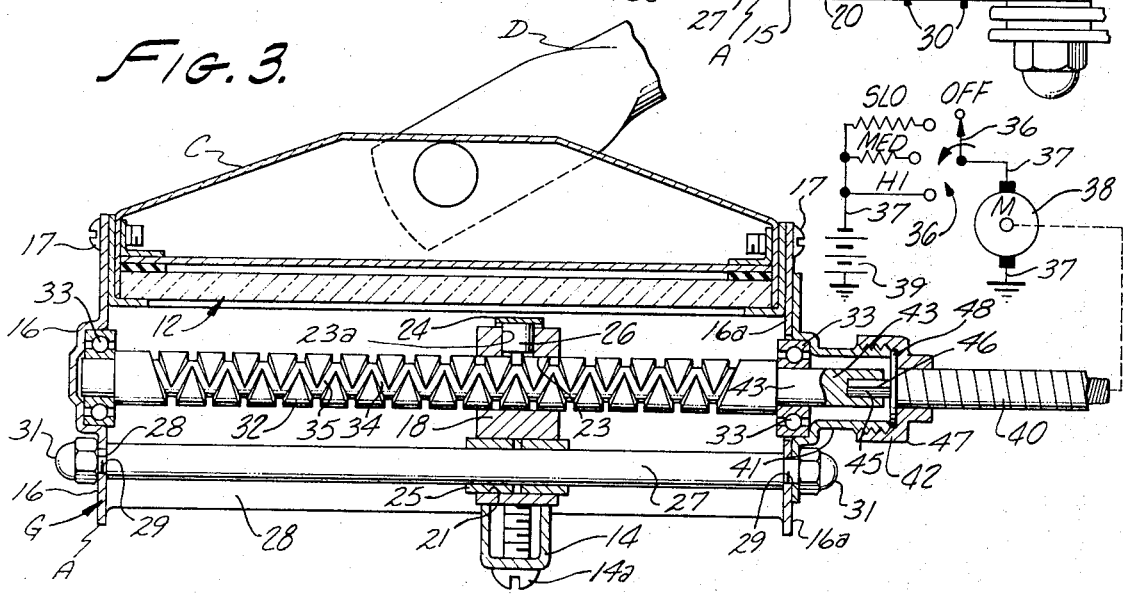
FIG. 3 is a transverse cross-sectional view of the device, taken on the line 3—3 of FIG. 1.

The invention A, as best seen in FIGS. 2 and 3, is operatively associated with a conventional side view mirror assembly B illustrated in FIG. 1. The assembly B includes a rigid frame C that is pivotally supported between two V-shaped brackets D that are secured to the cab E of the vehicle F. The mirror 10, as may best be seen in FIG. 1, is preferably of elongate rectangular shape and is vertically positioned along its major axis, situated within the confines of the frame C. The frame C includes first and second identical end pieces 11 that are connected by first and second side pieces 13 which are also of substantially identical structure. The mirror 10 is shown in FIG. 1 and is maintained in a clean condition by a vertically positioned wiper blade 12 that is alternately moved thereacross in opposite transverse directions by the invention A, as will later be explained in detail. The wiper blade 12 is of a conventional structure and is secured to an upwardly extending spring-loaded wiper arm 14 to maintain the wiper blade 12 in pressure contact with the mirror 10.

A transverse housing G is supported from the lower portion of the frame C, with the housing having a carriage 18 longitudinally movable within the confines thereof. The housing G, as can be seen in the drawings, is defined by first end plate 16 and second end plate 16a that are secured to the lower portions of the side pieces 13 by screws 17. The plates 16 and 16a have two side members 15 extending therebetween that serve to define a longitudinally extending opening 19 therebetween. A lubrication fitting 20 is mounted on carriage 18, and the upwardly disposed one of the side members 15 supports a spray nozzle 22, as shown in FIG. 2. The carriage 18 has first and second longitudinally extending bores 21 and 23 formed therein, as illustrated in FIG. 3.

A transverse opening 23a is formed in carriage 18 that is in communication with the second bore 23. Opening 23a serves to slidably support a pin 26 that is at all times urged inwardly by a spring 24 secured to the carriage 18. The first bore 21 serves to support a sleeve bearing 25 that slidably engages a guide rod 27 which has threaded ends 28 that extend through openings 29 in the end plates 16 and 16a. Threaded ends 28 are engaged by nuts 31. A second rod 32 is longitudinally disposed within the confines of the housing G, as may best be seen in FIG. 3, and is situated parallel to the first rod 27. The ends of second rod 32 are rotatably supported in two ball bearing assemblies 33 mounted on the plates 16 and 16a. The second rod 32 has first and second sets of spiral wound grooves 34 and 35 defined therein that are angularly disposed relative to one another and are connected at the ends thereof.

The spring-loaded pin 26 is at all times in engagement with either the first grooves 34 or second grooves 35 for reasons that will later be explained. An electric motor 38 is provided that by an electric circuit 37 is supplied electric energy from a source 39, such as a battery, or the like. The electric circuit 37 includes a rheostat type switch 36 to control the rate at which the direct current motor 38 operates. The motor 38 is adapted to drive a flexible cable 40, as may best be seen in FIG. 3, when the electric motor is energized by use of the switch 36.

An externally threaded tubular boss 41 extends outwardly from the second plate 16a and has an extension 43 of the second rod 32 situated therein and the extension having a non-circular recess 45 therein. The drive cable 40, as may best be seen in FIG. 3, terminates in a non-circular driving member 46 that slidably and removably engages the recess 45 of non-circular transverse cross section. A nut 47 engages the threaded boss 41 and due to a circular flange 48 on the driving cable 40, serves to hold the driving member 46 in driving engagement with the extension 43.

The carriage 18, as can best be seen in FIG. 2, has a first portion 18a thereof that extends outwardly through the opening 19. A cap screw 50 extends through lower portion of the arm 14, which arm as is conventional with such devices, includes a pivotally supported portion that, by spring means, at all tends to move inwardly towards the mirror 10.

The use and operation is relatively simple. When it is desired to actuate the invention A, the switch 36 is placed in an appropriate position, and the motor 38 drives the second rod 32. The pin 26, due to being in engagement with the grooves 34, moves the carriage 18, to the left as viewed in FIG. 3 until the carriage 18 has traversed the length of the rod 32 and the pin 26 then engages the grooves 35 to reverse the previous direction of movement of the carriage until it has again traversed the length of the rod, whereupon the operation is again reversed.

As the carriage 18 reciprocates from the left to the right, the wiper blade 12 is transversely moved across the mirror 10, and in so doing, removes all moisture and foreign material therefrom. The lubrication fitting 20 which may be of the Zerk type, is in communication with two bores 52 and 54 of small transverse cross section that permits grease to be periodically discharged onto the first rod 27 as well as the second rod 32.

The use and operation has previously been explained in detail, and need not be repeated.

I claim:

1. A power operated wiper adapted to be removably mounted on a side view mirror of the type that includes an elongate mirror supported in a rigid frame defined by a pair of horizontal end pieces that are connected by first and second vertical side pieces, which frame and mirror are pivotally supported by a pair of horizontal vertically spaced brackets exteriorly of a vehicle and in a position to be viewable by the driver of said vehicle, said wiper when operating removing moisture and dirt from said mirror, said wiper including:

a. an elongate rigid housing assembly that includes a pair of end pieces that project therefrom, with the projecting portions of the end pieces being disposed in abutting contact with the exterior surface of said first and second side pieces adjacent one of said end pieces of said frame, said housing defining a confined space therein that is in communication with a longitudinal opening formed in said housing that extends between said end pieces;

b. means for removably securing said end pieces to said first and second vertical side pieces to rigidly support said housing in a fixed position relative said frame and in a non-obstructing position relative to said mirror supported thereon;

c. a first guide rod disposed in said housing and extending longitudinally between said end pieces;

d. a second rod rotatably supported inside said housing between said end pieces and laterally spaced from said first rod and parallel thereto, which second rod has first and second longitudinal spiral grooves therein that are angularly disposed to one another and extend in opposite directions, with said first and second grooves connected on the ends thereof;

e. a carriage in said housing that slidably engages said first and second rods, with said carriage including a first portion that extends outwardly from said opening in said housing;

f. first means on said carriage that is at all times in engagement with either said first or second grooves;

g. a spring loaded arm secured to said first portion of said carriage, which arm extends over said mirror, which arm has a free end portion;

h. a wiper blade supported from said free end portion of said arm, which blade is in pressure contact with said mirror;

said an electric motor mounted on said vehicle in a position remote from said side view mirror for selectively rotating sai second rod at a desired speed in a first direction, with said carriage, arm, and wiper blade being alternately moved in opposite directions relative to said mirror to wipe moisture and dirt therefrom due to said first means alternately engaging said first and second grooves as said carriage traverses the length of said first and second rods;

j. a source of electric power;

k. flexible cable connecting said motor to said second rod to rotate the latter;

l. an electric circuit that connects said source of power to said motor;

m. a multi-position electric switch in said circuit that is operable from within said vehicle to control the magnitude of electric power flowing to said motor to regulate the speed at which said motor operates and the rapidity with which said wiper blade is reciprocated across said mirror.

2. An assembly as defined in claim 1 wherein said first means includes:
 i. a pin slidably mounted in an opening in said carriage that is normal to said first and second rods, with said opening being in communication with said second rod; and
 j. a spring mounted on said carriage that at all times engages said pin and maintains the latter in engagement with either said first or second groove.

3. An assembly as defined in claim 1 which further includes:
 i. third means on said carriage for applying a lubricant to said first and second rods to minimize friction as said carriage moves longitudinally relative thereto.

4. An assembly as defined in claim 1 which further includes:
 i. third means supported from said housing for discharging a spray of water onto said mirror to remove moisture and dirt therefrom.

* * * * *